May 12, 1959     K. SENNEWALD ET AL     2,886,413
PROCESS FOR THE PRODUCTION UNDER PRESSURE OF DRY
GASEOUS HYDROGEN CHLORIDE FROM CONCENTRATED
AQUEOUS HYDROCHLORIC ACID
Filed Jan. 31, 1956
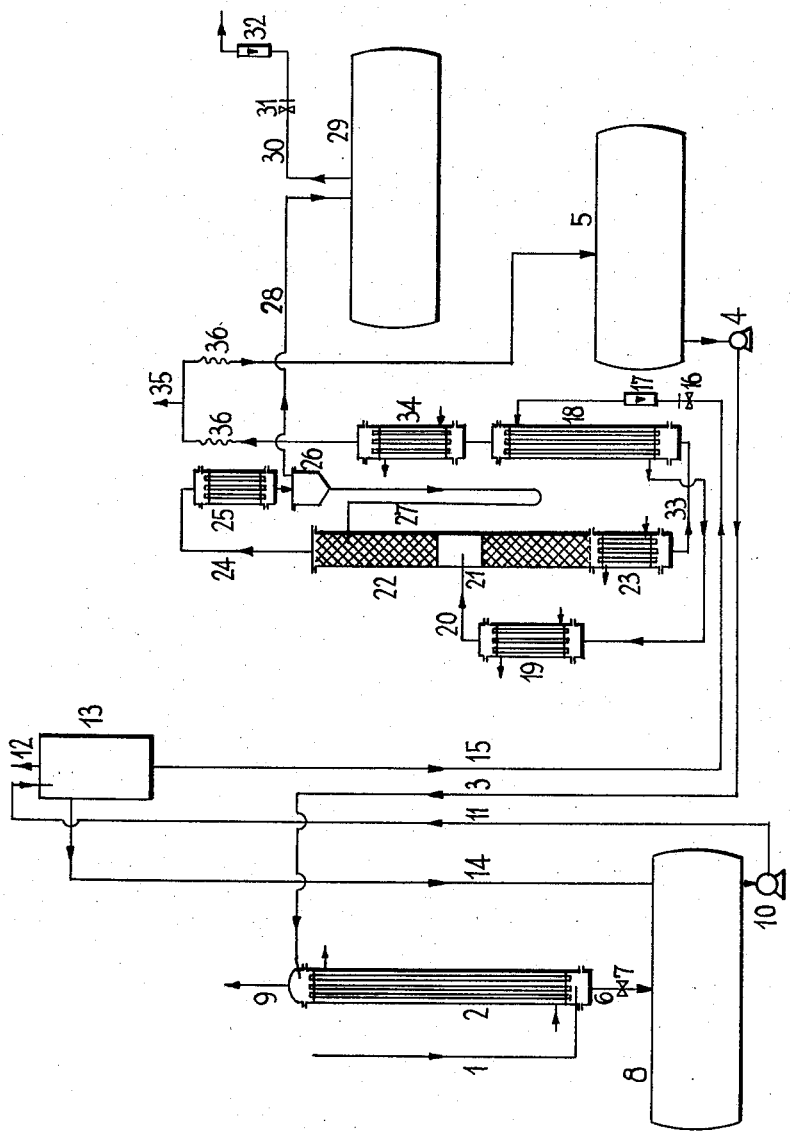
INVENTORS
KURT SENNEWALD
FRANZ POHL
BY
*their* ATTORNEYS

United States Patent Office 2,886,413
Patented May 12, 1959

2,886,413

PROCESS FOR THE PRODUCTION UNDER PRESSURE OF DRY GASEOUS HYDROGEN CHLORIDE FROM CONCENTRATED AQUEOUS HYDROCHLORIC ACID

Kurt Sennewald and Franz Pohl, Knapsack, near Koln, Germany, assignors to Knapsack-Griesheim Aktiengesellschaft, Knapsack, near Koln, Germany, a corporation of Germany Application January 31, 1956, Serial No. 562,562

Claims priority, application Germany February 5, 1955

5 Claims. (Cl. 23—154)

The present invention relates to a process for preparing dry gaseous hydrogen chloride, which is under a pressure of 1-2 atmospheres (gauge), from concentrated aqueous hydrochloric acid by pressure distillation in a column made of graphite material.

In some industrial processes involving, for example, chlorine substitution in an organic chemical synthesis, gaseous hydrogen chloride is obtained as by-product. This hydrogen chloride is often contaminated with inert gases and chlorine which has not reacted completely. When such hydrogen chloride is used, for example, for the preparation of vinyl chloride from acetylene and hydrogen chloride, it is indispensible to separate the gaseous contaminants from the hydrogen chloride. This may be done, among other ways, by absorbing the hydrogen chloride, for example, with water or dilute hydrochloric acid, so that the other gases are separated from the hydrogen chloride because they are not dissolved, or only little so.

The concentrated hydrochloric acid obtained by this absorption, which contains about 30–40 percent of hydrogen chloride, depending on the absorption pressure and absorption temperature, must be freed from the absorbed hydrogen chloride in a separating column. Doing this at about 120° C. from aqueous hydrochloric acid of 30–40 percent strength involves great difficulties due to the highly corrosive properties of hot concentrated hydrochloric acid.

As material for apparatus for the separation of hydrogen chloride, graphite impregnated with a plastic can be used with particular advantage. Due to the high cost of such apparatus it is very desirable to be able to prepare a fairly large quantity of hydrogen chloride in a few small graphite apparatuses, especially since there is a limit to the size of apparatus that can be constructed.

The separation of hydrogen chloride by distillation is normally carried out by charging the concentrated hydrochloric acid at the top of a separating column, the heat for separating the hydrochloric acid being supplied at the bottom of the column. The hydrogen chloride formed flows upwardly in the column, that is to say in a direction opposite to the downward flow of all the hydrochloric acid. With this mode of procedure the liquid soon floods the column so that the efficiency of the apparatus is restricted.

It is further known to carry out the separation of hydrogen chloride by distillation under a pressure of 1-2 atmospheres (gauge). In contradistinction to the mode of proceeding without the application of pressure, a substantially dry hydrogen chloride which need not be dried with concentrated sulphuric acid or calcium chloride is obtained directly. The separation of the hydrogen chloride under pressure in a graphite apparatus which is very susceptible to the risk of fracture, however, suffers from special technical difficulties with regard to the maintenance of a constant pressure and a constant level of the liquid in the sump of the separating column. Furthermore, special precautions against pressure (gauge) must be taken, which are, however, difficult in industry in the case of a graphite apparatus and in the presence of hot concentrated hydrochloric acid.

Now we have found that in the preparation of dry gaseous hydrogen chloride, which is under a pressure of about 1 to about 2 atmospheres (gauge), from concentrated aqueous hydrochloric acid by pressure distillation in a column made of graphite material, the disadvantages involved in the known processes can be avoided by proceeding as follows:

According to the invention, the concentrated aqueous hydrochloric acid is caused to flow continuously from an overflow vessel into the lower part of one or more evaporators, where it is heated to about 115 to about 120° C. under a pressure of about 1 to about 2 atmospheres (gauge). The resultant mixture of gaseous hydrogen chloride and dilute liquid aqueous hydrochloric acid is introduced, under the same pressure and in a tangential manner, from the upper part of the evaporator or the evaporators into a space free from filling bodies in the middle section of a separating column. The gaseous hydrogen chloride is also drawn off under pressure at the top of the column and—after having passed through a condenser and cooler—separated in a separator from the particularly highly concentrated liquid hydrochloric acid, which has been separated in said separator and is then reintroduced at the head of the separating column. The gaseous hydrogen chloride is introduced into a container which is under the same pressure, while the hydrochloric acid flowing in the lower part of the column is liberated in an evaporator arranged at the bottom of the column by a further supply of heat from the remainder of the hydrogen chloride capable of being separated by distillation and flowing upwardly in the column. The remaining azeotropic mixture of aqueous hydrochloric acid is cooled through heat exchangers and then allowed to run off by way of a siphon.

An advantageous modification of the procedure is as follows: By appropriate adjustment of the temperatures in the separating column, the part of the column above the site of injection is charged with a small quantity of liquid and the part below said site of injection is charged with a small quantity of gas. The temperature of the evaporator in the lower portion of the column can be adjusted to 110 to 130° C., preferably 115 to 125° C.

In carrying out the process of the invention the procedure may be, for example, as follows:

Concentrated aqueous hydrochloric acid of 36–40 percent strength is heated under pressure in one or more evaporators, for example under a pressure of 1–2 atmospheres (gauge) to 115–120° C., and the resultant mixture of gaseous hydrogen chloride and liquid dilute hydrochloric acid is injected under the same pressure (gauge) in a tangential manner into a space free from filling bodies in the middle section of a separating column. The hydrogen chloride, the moisture content of which corresponds to the water vapor pressure of the dilute hydrochloric acid at 100–120° C., rises in the column and leaves the top of the latter at about 90–100° C., after exchange of material and heat with a recycled particularly highly concentrated hydrochloric acid which flows downwardly in the column, while the liquid dilute hydrochloric acid which still contains about 23–25 percent of HCl flows downwardly in the column and can be heated in the sump of the column in order to be freed from hydrogen chloride which is still capable of being separated by distillation, until the azeotropic mixture of liquid hydrochloric acid is obtained.

After having left the top of the column, the gaseous hydrogen chloride which is still humid is introduced into a condenser and cooler in which practically the total amount of simultaneously evaporated water is precipitated at about 15–20° C. By this procedure the hydrogen chloride is obtained in the form of highly concentrated hydrochloric acid, corresponding to the elevated pressure of 1–2 atmospheres (gauge) prevailing in the column. The hydrochloric acid so obtained is reintroduced at the top of the column.

By the above method of separating hydrogen chloride by distillation the part of the column above the site of injection is charged with a small quantity of liquid and that below the site of injection with a small quantity of gas, so that in either part of the column the liquid is liable to flood.

In this manner the maximum throughput is much higher than in a process in which the concentrated hydrochloric acid is charged at the top of the column and the total amount of heat for separating the hydrogen chloride by distillation is supplied at the bottom of the column.

It has not hitherto been possible to construct apparatus of graphite material which have cross-sections of unrestricted size but only those of a maximum cross-section of 600–800 millimetres. This enables only a certain maximum production of hydrochloric acid per unit of time to be obtained. If it is intended that larger quantities of hydrochloric acid should be obtained, which of course necessitates larger cross-sections of apparatus, a second, third, and so on, separate complete apparatus must be parallelly built and operated. Relating the capacity of the apparatus to the diameter of the column, the process of the invention, however, readily leads to a production of hydrochloric acid 2–3 times superior to that obtained by the known processes. The new process therefore constitutes a great technical advance and offers special advantages from the point of view of economy as compared with the known art, since not only expensive graphite material is saved but in the production of hydrochloric acid on larger scale a multiplicity of complete apparatus can be dispensed with.

According to a further mode of performing the process of the invention, the gaseous hydrogen chloride leaving the cooler and condenser is introduced into a container which serves as gas quantity buffer and, since it is simultaneously under column pressure, also as pressure buffer, so that it balances fluctuations in quantity and pressure which may occur. In this manner uniform continuous working is ensured which enables a constant uniform current of hydrogen chloride gas to be continuously obtained, as it is required for further chemical reactions, particularly catalytic reactions.

The azeotropic mixture which runs out of the separating column at the sump and has a temperature of about 120° C. passes through a heat exchanger of graphite material with exchange of heat with the incoming hydrochloric acid of about 36–40 percent strength and flows by way of a water cooler and a siphon into a container for dilute aqueous acid. The hydrostatic height of the siphon which can be varied and adjusted by means of a rubber tube is in equilibrium with the pressure of the hydrogen chloride gas in the column and the hydrogen chloride buffer in such a manner that a certain level of liquid in the evaporator for the hydrogen chloride in the sump of the column is given. Controlling instruments, valves and other devices such as sight glasses for inspecting and maintaining the level of the liquid in the sump of the column and the pressure at the head of the column, as they are required in distilling columns, particularly for pressure distillation processes, can therefore be dispensed with. This constitutes a particular technical advantage especially in the present case in which the level of hydrochloric acid of about 120° C. must be maintained in a graphite apparatus which is highly exposed to the risk of fracture. The same applies to the adjustment of the pressure at the top of the column in the current of hydrogen chloride. Furthermore, the graphite apparatus, which is highly exposed to the risk of fracture as already mentioned above, is excellently protected against pressure (gauge) by the ventilated siphon so that specially constructed safety valves protected against corrosion can be dispensed with.

The entire apparatus can be further secured against pressure (gauge) by pumping the hydrochloric acid of 36–40 percent strength from the reservoir not into the evaporators direct but via a ventilated so-called overflow vessel which is in upright position, during which procedure a small part of the hydrochloric acid charged flows back into the reservoir through an overflow pipe arranged at the top of the overflow vessel and the major part passes through a pipe installed at the bottom of the overflow vessel and returns from below into the evaporator or the evaporators. The hydrostatic pressure of the hydrochloric acid column from the overflow tube to the entrance into the evaporators must be greater than the operating pressure of the column by 2–3 metres of water column. Besides the above mentioned protection against pressure, a very constant preliminary pressure is obtained which ensures good measuring of the injection of hydrochloric acid into the evaporators, which is also a precondition for undisturbed working of the column and constant production of hydrogen chloride gas.

The invention is illustrated by way of example in the accompanying diagrammatic drawing; and the following is a description with reference thereto:

Referring to the drawing, hydrogen chloride rendered impure with chlorine and inert gases is introduced through a conduit 1 into the lower part of an absorber 2 consisting of graphite tubes cooled with water. Dilute aqueous hydrochloric acid of about 20–40 percent strength is introduced from above through a conduit 3 from a container 5 by a pump 4. While the hydrogen chloride is substantially quantitatively absorbed and flows in the form of hydrochloric acid of 36–40 percent strength from the lower part of the absorber through a conduit 6 by way of an outlet valve 7 into a reservoir 8 for concentrated hydrochloric acid, the inert gases which have not been dissolved and the chlorine escape through a conduit 9 from the top of the absorber 2.

From the reservoir 8, the concentrated hydrochloric acid is pumped by a pump 10 through a conduit 11 into an overflow vessel 13 which is ventilated by a conduit 12. A part of the hydrochloric acid transported in excess returns through a conduit 14 into the reservoir 8, while the major part of the hydrochloric acid is pumped by way of a conduit 15, regulating valve 16, flowmeter 17 and heat exchanger 18 into an evaporator 19. The heat exchanger 18 and the evaporator 19 are also of graphite material.

The hydrochloric acid which has been preheated in the heat exchanger to about 70–80° C. is further heated in the evaporator to about 120° C., the major part of the hydrogen chloride absorbed in the absorber being desorbed, that is to say, corresponding to the temperature and pressure of about 1–2 atmospheres (gauge), a mixture of humid hydrogen chloride gas and dilute aqueous hydrochloric acid containing about 22–24 percent of hydrogen chloride is formed in the evaporator. By way of a conduit 20, said mixture is injected in a tangential manner into space 21, containing no filling bodies, of a separating column 22 which is also made of graphite. Owing to said space 21 and the tangential manner of injecting said mixture of gas and liquid, the liquid phase is rapidly separated from the gaseous one. The former trickles in the form of aqueous hydrochloric acid of 25–26 percent strength through between the filling bodies in the lower part of the column and enters an evaporator 23 in which the hydrogen chloride, vaporizable to the liquid aqueous hydrochloric acid azeotrope, is separated by distillation and flows together with the hydrogen chloride, which has already been delivered from the evaporator 19, into the upper part of the column and is then passed through a conduit 24 into an appliance 25 which serves as condenser and cooler.

In the appliance 25 substantially all the moisture is condensed at 15–20° C. under a column pressure of about 1–2 atmospheres (gauge) in the form of highly concentrated hydrochloric acid of 60–70 percent strength which flows together with the hydrogen-chloride gas into a separator 26. From said separator the liquid highly concentrated hydrochloric acid returns by way of a siphon 27 into the upper part of the column 22, while the now substantially dry hydrogen chloride having a moisture content of only 0.02–0.03 percent by weight of $H_2O$ flows through a conduit 28 into a container 29 which serves as reservoir for the hydrogen chloride gas and column pressure buffer. From container 29, which may be of iron but is suitably lined with acid-proof material as also is or may be conduit 28, a constant and dry current of hydrogen chloride can be taken by way of a conduit 30, regulating valve 31 and flowmeter 32 for the hydrogen chloride gas. The liquid hydrochloric acid azeotrope which is present in the evaporator 23 at the bottom of the column and has a temperature of 120° C. flows through a conduit 33, heat exchanger 18, cooler 34 and a ventilated siphon 35 into the container 5 from where the dilute hydrochloric acid is returned into the absorber 2 as described above. The height of the siphon 35 can be adjusted by the rubber-tube connections 36 in such a manner that the desired column pressure and simultaneously a certain level of the liquid in the evaporator at the bottom of the column are produced.

We claim:
1. In the process for obtaining dry, gaseous hydrogen chloride from strong aqueous hydrochloric acid by distillation from a column of limited cross-sectional area, the improvement by which the strong acid is heated to a temperature of between about 115° C. and 120° C. to form a mixture of hydrogen chloride gas and aqueous azeotropic hydrochloric acid, injecting said mixture, while at said temperature and at a pressure of from about 1 to 2 gauge atmospheres, tangentially into an unfilled separation zone in an intermediate portion of a filled distilling column where the turbulence effected by the tangential injection of said mixture causes a separation of the hydrogen chloride gas from the aqueous acid, said gas being directed upwardly from the separation zone to a discharge zone and said aqueous acid being directed downwardly into a heating zone, supplying heat to said heating zone to evolve a further portion of hydrogen chloride gas from the aqueous acid in said heating zone, directing the resulting hydrogen chloride gas mixture at the above pressure from the discharge zone into a condensing zone were the residual moisture content thereof is substantially separated therefrom as a small amount of a strong aqueous hydrochloric acid solution, collecting the substantially dry hydrogen chloride gas left by the condensing acid in a collection zone, directing the condensed acid downwardly through the upward path of the hydrogen chloride gas mixture distilling in the column to strip an additional amount of hydrogen chloride gas therefrom and removing the azeotropic acid from the heating zone so as to keep the liquid level in the column below the separation zone.

2. The combination of claim 1 in which the temperature in the lower portion of the distilling column is between 115° C. and 125° C.

3. The combination of claim 1 in which the condensation is carried out at a temperature between about 15° C. and 20° C.

4. The combination of claim 1 in which distillation takes place in a continuous manner, fresh acid being continuously introduced while the azeotropic acid collected in the distillation column is continuously removed, and the pressure within the column is maintained by hydrostatic heads in both the stream of incoming acid and the stream of outgoing acid.

5. The combination of claim 1 in which the substantially dry hydrogen chloride gas is collected in a collection zone of large volume to act as a buffer against fluctuations in gas separation rate as well as in the liquid level within the distilling column.

References Cited in the file of this patent

UNITED STATES PATENTS

| | | |
|---|---|---|
| 1,563,732 | Egleson | Dec. 1, 1925 |
| 1,892,652 | Heath | Dec. 27, 1932 |
| 1,897,996 | Barstow et al. | Feb. 21, 1933 |
| 1,906,467 | Heath | May 2, 1933 |
| 2,545,314 | Seebold | Mar. 13, 1951 |